United States Patent Office 3,451,176
Patented June 24, 1969

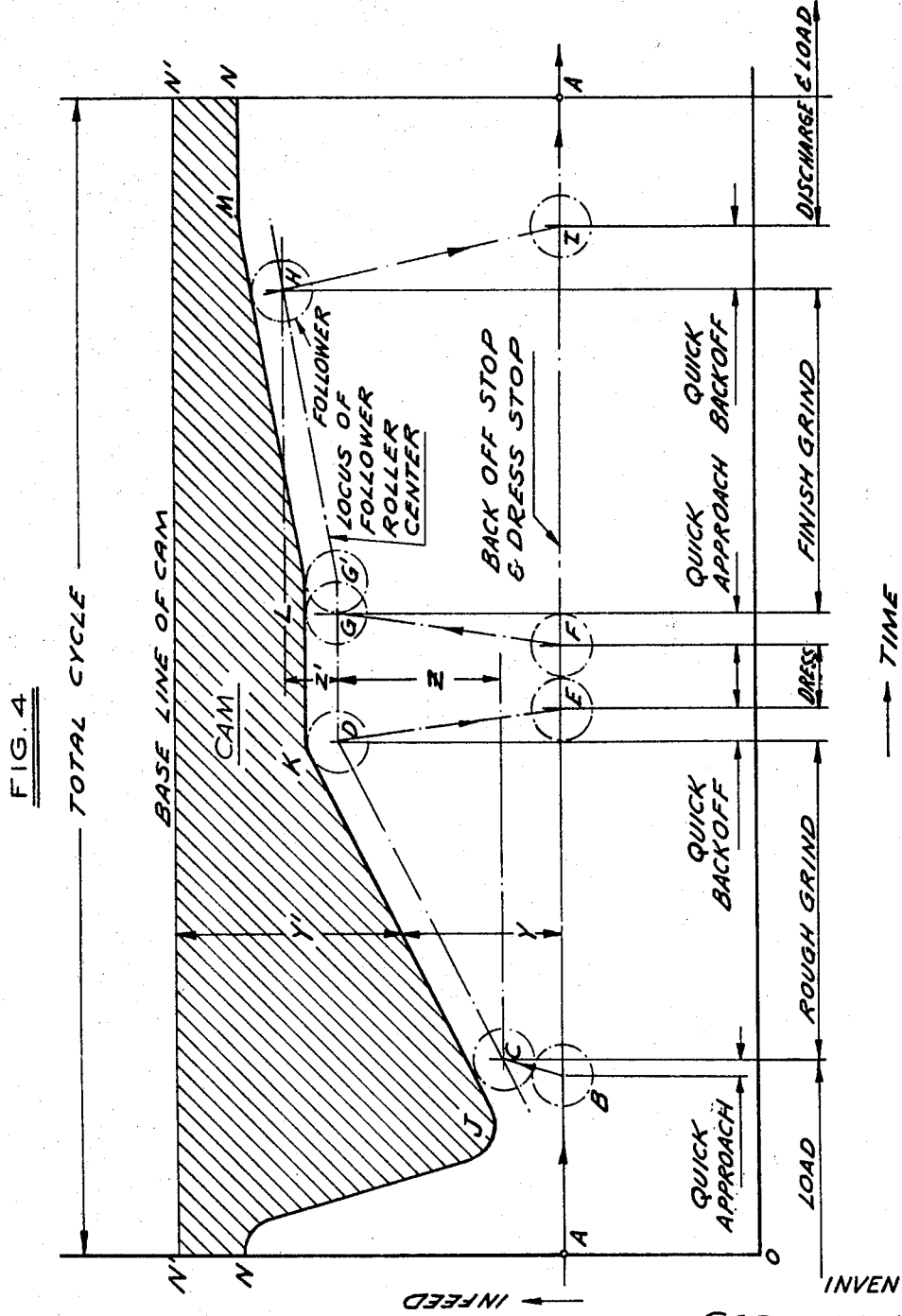

3,451,176
MACHINE TOOL FEEDING MECHANISM
Gordon E. Lillie, Upper Meadows, Vt., assignor to
Bryant Chucking Grinder
Filed Oct. 31, 1966, Ser. No. 590,591
Int. Cl. B24b 49/08, 51/00
U.S. Cl. 51—165                                                    19 Claims

ABSTRACT OF THE DISCLOSURE

An inverted feed mechanism which controls the infeed of a machine tool, such as a grinding wheel, by means of a radially receding cam. The cam follower rolls on the cam surface, rotating a feed nut threaded on a feed screw, thus moving the wheel toward the workpiece. The wheel may be retracted from the workpiece at any time by retracting the cam follower from the cam, and may be replaced at the same point when desired.

---

This invention relates to grinding machines, and more particularly to means for feeding the grinding wheel toward and away from the work.

It is an object of the present invention to provide a novel and improved feed mechanism which permits a highly accurate and closely controlled feed movement of the grinding wheel at variable speeds.

It is another object to provide an improved grinder feed mechanism which will repeat consistently and accurately, is safe, and easily controlled by the machine operator, without danger of maladjustment.

It is also an object to provide a feed mechanism adaptable to versatile control of the feed rate, feed amount, approach rate, approach amount, and sequence of operation, and in which one cam is adaptable to a variety of workpieces.

Other objects, features, and advantages of the present invention will become apparent from the subsequent description, taken in conjunction with the accompanying drawings, in which:

FIGURE 4 is a graphical presentation of a typical feed cycle.

In general terms, the invention includes a feed screw adapted to be connected to a movable part, such as the spindle support of a grinder, which must be cross-fed into and out of the workpiece surface at accurately controlled rates. Reference is made to applicant's copending application Ser. No. 477,255, filed on Aug. 4, 1965, now Patent No. 3,344,560, issued Oct. 3, 1967, which discloses a feed mechanism and its operation; and further includes a schematic diagram disclosing a series of operations which automatically control the movements of such a machine. The cross-feed system for rotating the feed nut is disclosed in U.S. Patent 3,043,062 issued July 10, 1962. In the embodiment therein illustrated, the feed nut is threaded on a stationary member and engageable with the end of an adjusting screw, the adjusting screw having a threaded portion mounted in the spindle support. The adjusting screw is rotatable by manual means to adjust the wheel position relative to the ground surface on the workpiece. The adjusting screw is movable linearly in a manner disclosed in said patent.

The improvement disclosed herein relates to cam feed mechanism which provides instant back-off at any time without reversing the cam. In cam feeds up to now, the cam has been rotated forcing the cam follower radially outward to rotate the feed screw and push the spindle support holding the wheelhead toward the workpiece. However, in place of using a mechanical cam to both power and control the feed, the intent of this invention is to invert the approach, that is, use hydraulic or air pressure for the power function, and the cam for control only. As a consequence, the cam drive power requirement is much less, and a wider range of control is now possible, with less cost and with an inherently better condition for regulation. By freeing the cam drive system from the former, positive mechanical action, it is now possible to interrupt the cycle program at any feed position simply by retracting the follower from its controlling cam surface. The direction of retraction corresponds to retracting the feed. The back-off can be instantaneous and, if the cam is stopped, the feed can be resumed exactly where interrupted by replacing the follower on the cam. This was not possible in any controlled feed mechanism heretofore.

Figure 1:
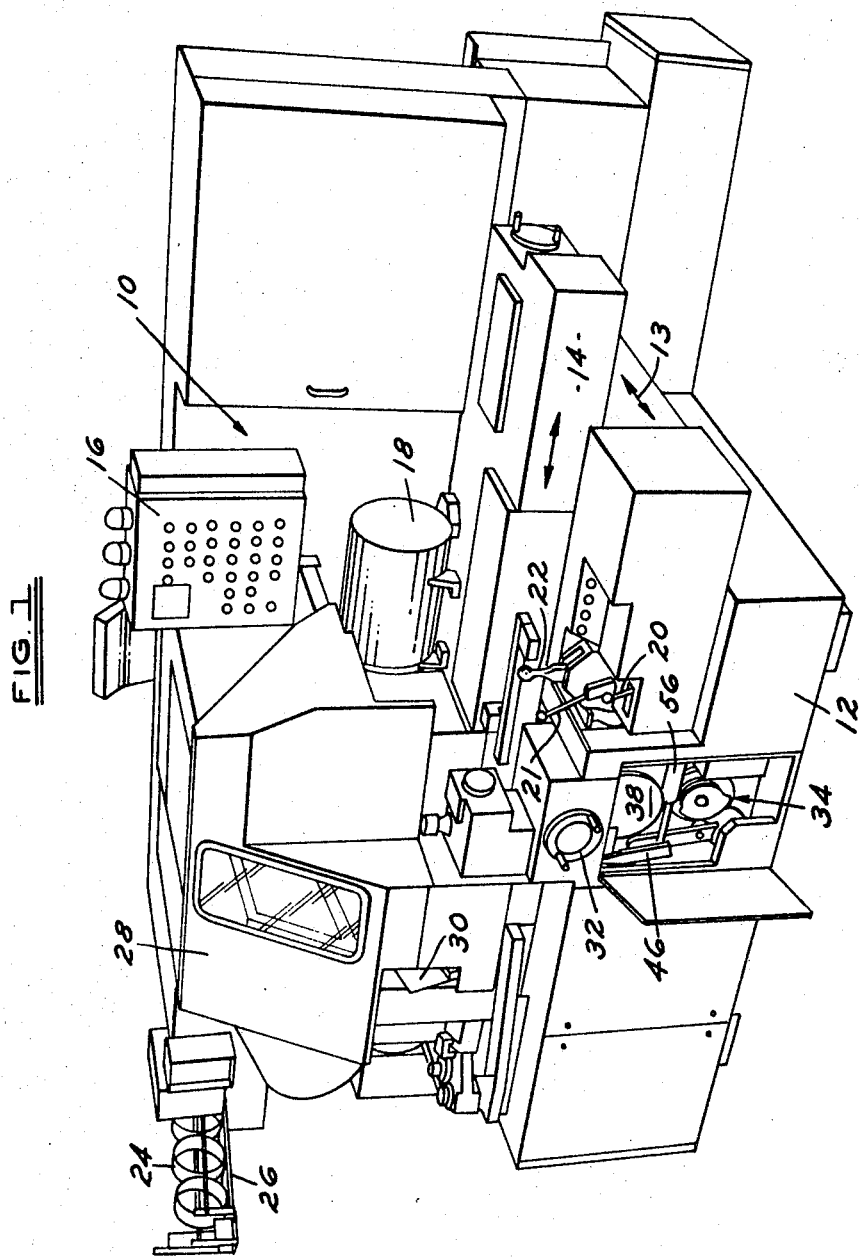
FIGURE 1 is a perspective view in elevation of a grinding machine embodying the principles of the invention.
Figure 3:
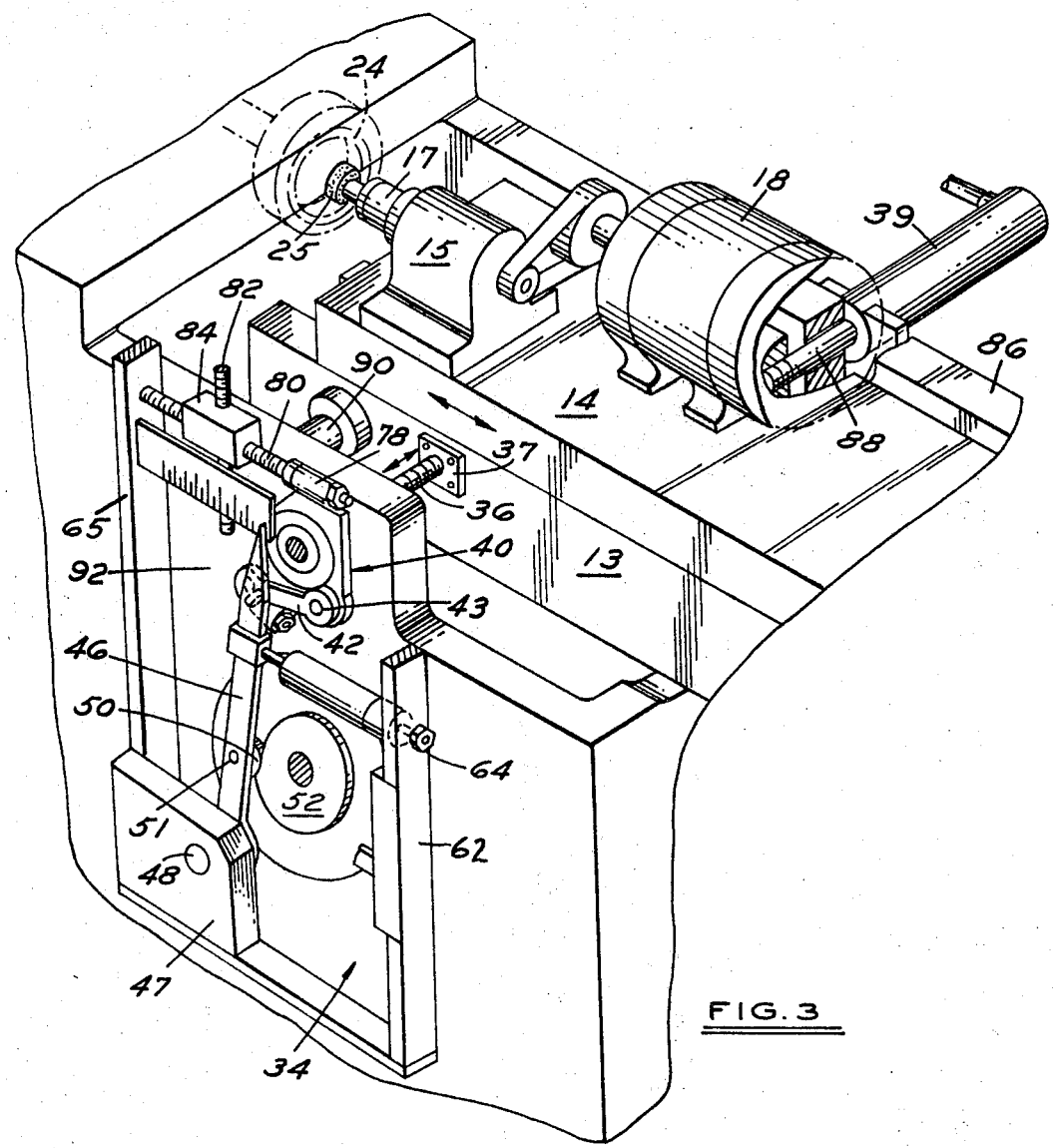
FIGURE 3 is a perspective view in elevation of the feed mechanism showing the relative location of the feed screw and cam and feed linkage.

Referring more particularly to the drawings, FIGURE 1 illustrates a typical grinding machine 10 having a bed or base 12 on which a transversely movable cross-feed table or saddle 13 is supported thereon. A longitudinal slide 14 is supported for longitudinal movement on the transversely movable cross-feed table 13. A panel 16 is mounted on the machine, and includes various switches and lights that control the operation of the machine. A motor 18 is mounted on the longitudinal slide 14 is used for rotation of the spindle 17 holding the grinding wheel 25 as shown in FIGURE 3. The movement of the slide 14 is controlled in a conventional manner, well known to those skilled in the art, through control levers 20 and 21 and reversing lever 22.

The workpiece 24, a bearing in this case, is adapted to roll down the loading chute 26 and into the work area, covered by a conventional hinged splash guard 28. The splash guard confines spray and swarf in a localized area where the grinding takes place. After completion of the grinding operation the workpiece is adapted to roll down the discharge chute 30 and into a bin or other workpiece gathering means.

A cross-feed handwheel 32 is adapated to be manually operated to change the reference point of grinding wheel cross-feed with respect to the workpiece by rotating gear 38 and feed screw 36. The feed mechanism 34 is housed beneath the handwheel 32.

Figure 2:
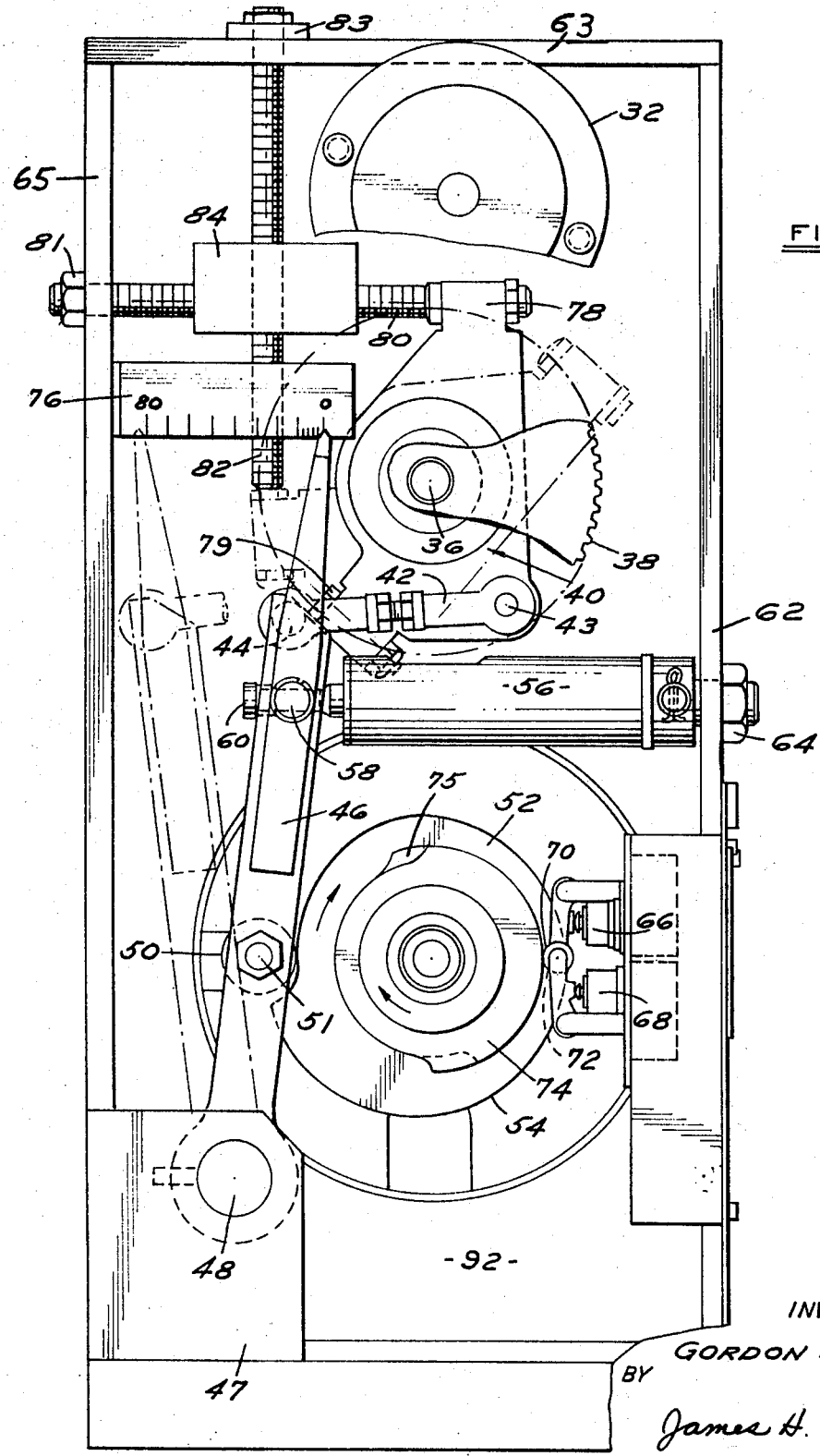
FIGURE 2 is a front elevational view of the feed mechanism showing the relative locations of the cam and feed linkage.

FIGURE 2 represents an elevational view of the feed mechanism 34, and includes the components necessary for regulation of the feed. The rotational movement of the feed screw, accomplished by handwheel 32 which rotates gear 38, is used for coarse transverse adjustments such as positioning the cross-feed table 13 for a new wheel, or a different size workpiece. After the table is so positioned, the handwheel is locked against accidental rotation, which in turn locks the feed screw. The fine feed during grinding is accomplished by rotation of feed nut 40, in a manner to be explained hereinafter. Any axial movement of the feed screw 36 causes translation of the cross-feed table 13 by pressure against the hardened pressure plate 37 attached to the front of the table (shown in FIGURE 3). The cross-feed table 13 is always kept in solid contact with the tip of the feed screw 36 by any means, here represented by a fluid cylinder 39 maintaining a force on the cross-feed table 13. The cylinder 39 is mounted on the back support wall 86 with its piston rod 88 connected to the cross-feed table 13, to provide a constant force of the cross-feed table 13 against the feed screw 36. Movement of the cross-feed table 13 transverse or relative to the longitudinal movement of the slide 14 is accomplished by trunnion bearings (not shown) mounted for movement on trunnion bar 90.

An adjustable linkage 42 is connected at its one end 43 to feed nut 40 and at its other end to cam-follower lever 46. The cam-follower lever 46 is pivotally connected at 48 to a support member 47 of the machine. The lever 46 includes a cam follower 50 connected at 51 which rolls on feed cam 52. Cam 52 rotates, in the preferred embodiment shown, in a clockwise direction by means of any suitable rotational mechanism, or through any suitable gear reducing mechanism, not shown. As shown in FIGURE 2, the cam surface 54 can be concentric, spiral, eccentric or having variable radii portions and as the cam 52 revolves, the cam follower 50 follows the contour of cam surface 54 and through its linkage 42 rotates the feed nut 40. Rotation of the feed nut 40 causes axial translation of the non-rotating feed screw 36 on which it is threaded. The feed nut is restrained from axial movement at all times by bearings (not shown).

To control and maintain cam follower lever 46 in proper position, the piston rod 60 of a double-acting fluid cylinder is attached thereto by means of pivotal connection 58. The fluid cylinder is pivotally secured to the side support 62 by means of a nut 64. As shown in FIGURE 2, in dotted line, whenever the piston rod 60 is extended, the cam follower lever is in the extreme left or retracted position. This is the position when a new workpiece is being inserted. The control of the feed mechanism is accomplished through a series of cam switches 66 and 68 which have cam rollers 70 and 72 connected respectively thereto and which roll on plurality of program cams 74 and 75, in a manner disclosed in applicant's above mentioned copending application.

The extent of the grinding operation is viewed on a scale 76 to show the amount of feed. When the cam follower lever 46 is in the position shown in FIGURE 2, the grinding operation is considered complete, and the necessary switches are de-energized to reverse fluid cylinder 56 thereby retracting lever 46 to the position shown dotted in FIGURE 2. Rotation of feed nut 40 is limited in each direction, that is, at the termination of grinding a workpiece, the "end-of-grind" stop 78, which is integrally connected with the feed nut 40, is set firmly against an adjustable "finish-stop" screw 80. Similarly, the "back-off" stop screw 82. The adjustable screws 80 and 82 are bolted to the side support member 65 and top support member 63 by nuts 81 and 83 respectively, and held in place by a suitable support block 84 mounted onto machine frame front wall portion 92, as shown in FIGURES 2 and 3.

As explained above, to manually control the movement of feed screw 36, the cross-feed handwheel 32 is turned, which turns gear 38. Since gear 38 is connected to feed-screw 36, any movement of the handwheel rotates the feed screw which in turn positions the grinding wheel 25 in the spindle support means or wheelhead 15 relative to the workpiece. The rotational movement of feed nut 440 moves the feed screw 36 and feeds the grinding wheel into the workpiece at a rate controlled by the cam 52. That is, the contoured circumferential surface 54 of the cam 52 determines the amount of rough grinding, dwell, and finish grinding that the workpiece requires.

The improvement apparent in this invention, is that the cam follower 50 is maintained in contact with the cam surface 54 by means of fluid cylinder 56, and follows the cam surface radially inwardly during the complete programmed cycle. It is retracted to a safe back-off position whenever the piston rod 60 is extended.

When it is necessary to stop the programmed cycle of the grinding operation for some reason, as for example, to change the grinding wheel, the rotation of the cam 52 is stopped and the cylinder 56 reversed, thus retracting the lever-cam-follower combination. This in turn moves the feed screw 36 by rotating feed nut 40 through the linkage connection 42, and consequently moves the cross-feed table 13 holding the spindle 15 supporting the grinding wheel 25 away from the workpiece. Previous cam designs were of the type that the grinding wheel moved toward the work-piece in response to a radially increasing "lever-cam-follower" movement; however, the lever could not be retracted until the cam was rotated backward, or a recess was designed into the cam contour to allow for retraction of the grinding wheel from the workpiece. In the invention described hereinabove the lever-cam-follower combination can be moved radially outward, and back into position against the cam 52 at any point in the grind cycle without initiating a new feed program, thus providing great flexibility in programming.

A further advantage becomes evident. In programming a grind cycle, a quick approach to the grind surface on a workpiece by the wheel, followed by a slow feed into the workpiece is provided without designing it into the cam contour. This is now accomplished by the action of the cylinder which moves the "lever-cam-follower" combination from the back-off position to contact the cam surface ("quick approach"), followed by the feed rate during the grinding cycle as controlled by the slope or contour of the cam. Multiple dress cycles become simple and can be accomplished as often as required, without cam detail change, since dressing can be done with the lever in the backed-off or retract position. Heretofore the slope of the cam surface varied to meet the requirement of quick approach, slowest grind feed, etc.; the cam surface may now incorporate perhaps only two slopes with two concentric portions for dwell in the feed cycle.

To further explain the advantages and purposes of the invention, reference is made now to FIGURE 4, which shows a typical grind cycle in graphical form. Here the ordinates represent distance of the "infeed" above the "back-off stop" and/or "dress stop." The abscissae represent "time."

Reading from the left side or origin the events take place in sequence as follows:

A to B—the new workpiece is loaded into the chuck.

B to C—"quick approach" of the grinding wheel to the workpiece by action of the double acting fluid cylinder which moves the cam-follower up into contact with the cam at C.

C to D—"rough grind" of the workpiece occurs as the cam-follower moves along the cam surface. The steeper slope represents faster "infeed."

D to E—"quick backoff" of the grinding wheel from the workpiece by retraction of the double acting cylinder to the "dress stop."

E to F—dress of the grinding wheel occurs.

F to G—"quick approach" occurs to contact the grinding wheel and workpiece at the same level on the cam as "D."

G–G′–H—"finish grind"—the cam-follower moves on the cam periphery.

H to I—"quick backoff"—cylinder retracts grinding wheel from workpiece.

I to A—end of cycle—finished workpiece is ejected.

By keeping the loading chute filled, the cycle can be repeated indefinitely until the grinding wheel requires changing.

At the top of the graphical representation, FIGURE 4, the cam is represented as a straight plate. The contour of the plate represents the "negative," so to speak, of the grind position C to D and G′ to H. The position of D to G′, it will be noted, is a horizontal line—a dwell on the cam periphery. If we let Y represent the movement desired by the cam-follower, then Y′ can represent the corresponding ordinate on the cam from its base line.

For ease of application, the preferred embodiment utilizes a circular plate cam which is graphically shown in FIGURE 4, where the base line N′ to N′ represents the concentric circumference of a circle about the axis of the cam, and the ordinates Y', represent lines, radiating from the base line of the cam to define the contoured periphery of the cam, such as N–J–K–L–M–N, and which is shown in FIGURE 2 as cam surface 54.

It is to be further understood that the slope portions J–K and L–M of the cam shown in FIGURE 4 can be spirals of non-concentric portions of different slopes on a circular plate cam while the horizontal line portions K–L and M–N are concentric portions. The portion from N to J is not significant. It is merely a blend between high and low rises.

The universal nature of the cam should be mentioned here. The portions J–K and L–M are purposely made somewhat longer than the required positions C–D and G–G'–H. This allows for parts whose required follower movement Z and Z' (for rough and finish grind), vary from that shown, to be programmed on the same cam by adjusting positions C and H, while holding D and G constant. Z and Z' are proportional to the amount of material removed in "rough grind" and "finish grind."

While in the foregoing description the invention was explained in connection with certain specific terms and language, it is understood that the present disclosure is illustrative rather than restrictive and that changes and modifications can be resorted to without departing from the spirit of the invention as defined by the claims which follow.

What is claimed is:

1. In a machine having apparatus for removing metal from the surface of a workpiece, the combination comprising:
    (a) a table;
    (b) a spindle support means carried by said table;
    (c) plate cam means having a radial circumferential surface and adapted to rotate at a predetermined speed and at predetermined intervals of time;
    (d) means for moving said spindle support means transversely of said workpiece controlled by said cam means; and
    (e) means for separating said spindle support means and said workpiece without rotating said plate cam means.

2. The machine as defined in claim 1 wherein said means for moving said spindle support means includes:
    (a) a lever,
    (b) said lever having a cam follower thereon, said cam follower adapted to move on the circumferential surface of said cam means,
    (c) a feed screw movable against said spindle support means,
    (d) a mating nut attached to said feed screw, and
    (e) an interconnecting link means connecting said mating nut and said lever, whereby movement of said lever caused by said cam follower rolling on said surface of said cam causes movement of said mating nut and said feed screw to move said spindle support means.

3. The machine as defined in claim 2, wherein
    (a) said circumferential surface of said cam means includes at least one progressively decreasing radially inwardly slope portion.

4. The machine as defined in claim 2, wherein:
    (a) said circumferential surface of said cam means includes a plurality of progressively decreasing radially inwardly slopes and at least one concentric portion.

5. The machine as defined in claim 1, wherein:
    (a) said spindle support means is mounted on a longitudinally extending slide means;
    (b) said spindle support moving means mounted on said machine includes,
        (1) a feedscrew adapted to move said spindle support means transversely on said workpiece,
        (2) lever means having a cam follower for movement on said radial circumferential surface of said cam means,
        (3) means for maintaining said lever means on said radial circumferential surface of said cam means, and
        (4) means connected with said feedscrew and said lever means to effect transformation of said rotational movement of said cam to translational movement of said feedscrew, whereby said spindle support is adapted to move transversely relative to said workpiece.

6. The machine as defined in claim 5, further providing that
    (a) said circumferential surface of said cam includes at least one progressively decreasing radially inwardly slope portion.

7. A machine supporting a workpiece on which a surface is to be ground having:
    (a) a spindle support for supporting a wheelhead, and
    (b) means for moving said workpiece and wheelhead, transversely of one another, including
        (1) a cam on which
        (2) a fluid cylinder biased cam follower moves transmitting motion through suitable linkage,
        (3) said cam of a receding nature such that as the follower approaches the base line of said cam, the workpiece and wheelhead are brought closer together.

8. The machine as defined in claim 7 further including the combination of:
    (a) a lever pivoted at one end carrying
    (b) said follower and
    (c) linkage for rotating
    (d) a feed nut threaded on
    (e) a feedscrew for imparting transverse motion to bring the workpiece and wheelhead closer together.

9. The machine as defined in claim 8 in which the follower is mounted in such a manner that the workpiece and wheelhead may be separated immediately by lifting the follower off the cam.

10. The machine as defined in claim 9 in which the cam is of a generally spiral shape, radially receding as the workpiece and wheelhead approach each other in a transverse direction.

11. The machine as defined in claim 10 in which the spiral surface has a plurality of spiral slopes and at least one concentric segment.

12. The machine as defined in claim 9 in which the cam surface is generally of a tapering shape becoming narrower as the workpiece and wheelhead approach each other transversely.

13. The machine defined in claim 9 in which the cam surface is uniformly sloped from a maximum to a minimum as the feed progresses.

14. A method of grinding a workpiece by means of a grinding wheel controlled by a follower rotated feed nut and an inwardly spiralled cam comprising the steps of:
    (a) rotating the cam in the direction of receding radius, and
    (b) maintaining the follower in contact with the cam by fluid pressure means as the grinding wheel penetrates the workpiece.

15. A method of grinding as defined in claim 14 further providing the facility of quickly backing off the feed, comprising the steps of:
    (a) reversing the fluid pressure, and
    (b) retracting the cam follower without the necessity of reversing the cam.

16. A method of grinding as defined in claim 14, which provides a facility of dressing the wheel comprising the steps of:
    (a) stopping the cam rotation,
    (b) retracting the follower to a backoff stop for a dressing operation, (c) returning the follower to the cam at the same point, and (d) restarting the cam to continue the grinding operation.

17. A method of feeding a grinding wheel into a workpiece comprising the steps of:

(a) rotating a cam of progressively radially decreasing cam surface, (b) holding a cam follower to follow said cam surface, and (c) retracting said follower from said cam surface to retract the grinding wheel from the workpiece.

18. A method of feeding a grinding wheel as defined in claim 17, further comprising the steps of:

(a) stopping the cam motion simultaneously with said retracting of the follower to retract the wheel, and (b) restoring the wheel to the same grind position by moving the cam follower back to the cam as the cam motion is restarted.

19. A machine for metal removal from a workpiece by means of a tool, comprising:

(a) a workpiece supporting means;

(b) a spindle supporting means;

(c) means for moving said spindle supporting means relative to said workpiece supporting means;

(d) said moving means including:

(1) a cam, said cam having an eccentric circumferential surface thereon;

(2) a cam follower means, said cam follower means adapted to be biased against said cam;

(3) feed screw means connecting said spindle supporting means and said cam follower means; and (4) piston means for moving said cam follower means toward or away from said cam, thereby causing relative movement of said spindle support means toward or away from said workpiece.

References Cited

UNITED STATES PATENTS

| | | | |
|---|---|---|---|
| 2,404,210 | 7/1946 | Bechler. | |
| 909,300 | 1/1909 | Hirth | 51—165 |
| 1,023,389 | 4/1912 | Olsen | 51—165.02 |
| 1,754,140 | 4/1930 | Asbridge | 51—165 |
| 2,028,642 | 1/1936 | Arter et al. | 51—165.06 |
| 2,486,244 | 10/1949 | Balsiger et al. | 51—165 X |
| 2,657,505 | 11/1953 | Price | 61—165 |
| 3,043,062 | 7/1962 | Lillie | 51—165 |
| 3,344,560 | 10/1967 | Lillie | 51—165 |

LESTER M. SWINGLE, *Primary Examiner.*